(12) United States Patent
Gotou

(10) Patent No.: US 6,402,356 B2
(45) Date of Patent: Jun. 11, 2002

(54) VEHICLE LAMP

(75) Inventor: Yoshimasa Gotou, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/770,282

(22) Filed: Jan. 29, 2001

(30) Foreign Application Priority Data

Jan. 27, 2000 (JP) ........................................ 2000-018800

(51) Int. Cl.$^7$ ................................................ F21V 13/00
(52) U.S. Cl. ...................... 362/543; 362/544; 362/517; 362/518; 362/241; 362/247
(58) Field of Search ................................. 362/543, 544, 362/516, 517, 518, 519, 520, 521, 522, 241, 247, 245, 327

(56) References Cited

U.S. PATENT DOCUMENTS

| 4,198,674 | A | * | 4/1980 | Ilhage et al. ................. 362/544 |
| 4,912,606 | A | | 3/1990 | Yamamoto |
| 5,081,564 | A | | 1/1992 | Mizoguchi et al. |
| 5,552,969 | A | | 9/1996 | Murakami |
| 5,692,824 | A | * | 12/1997 | Ooishi ......................... 362/505 |
| 5,702,173 | A | | 12/1997 | Kawamura |
| 5,941,633 | A | * | 8/1999 | Saito et al. .................. 362/543 |
| 6,270,241 | B1 | * | 8/2001 | Collot et al. ................. 362/544 |

* cited by examiner

Primary Examiner—Sandra O'Shea
Assistant Examiner—Ronald E. DelGizzi
(74) Attorney, Agent, or Firm—Sughrue Mion, PLLC

(57) ABSTRACT

A vehicle lamp having a body, a lens, a first light source, a reflector, and a second light source. The body has a front face, a side, and an opening face, wherein the opening face is curved from the front face to the side. The lens covers the opening face of the body. A lighting chamber is defined by the body and the lens. The first light source and the reflector are arranged in the lighting chamber. The reflector includes a front side for reflecting the rays of the first light source substantially in the front direction, and also includes a reverse side. The second light source is arranged adjacent the reverse side of the reflector so that rays of the second light source are reflected by the reverse side of the reflector and are irradiated substantially to the side of the body.

11 Claims, 3 Drawing Sheets

VEHICLE LAMP

BACKGROUND OF THE INVENTION

1. Field of the Invention

The present invention relates to a new vehicle lamp. More particularly, the present invention relates to a technique for reducing the thickness of a sidwardly curved section in a vehicle lamp, wherein the sidewardly curved section functions to irradiate the side of a vehicle.

2. Description of the Related Art

Some vehicle lamps have a sidewardly curved section for irradiating the side of the vehicle, for example, and function as a side marker lamp as well as a tail and stop lamp. In such a lamp, it is conventional that an electric bulb to be used as a side marker lamp is arranged in the sidewardly curved section.

In the above conventional vehicle lamp, the following problems may be encountered. The thickness of the sidewardly curved section is increased because the electric bulb is arranged in the sidewardly curved section.

SUMMARY OF THE INVENTION

It is an object of the present invention to reduce the thickness of the sidewardly curved section in a vehicle lamp having such a sidewardly curved section for irradiating the side of the vehicle.

In order to solve the above problems, the present invention provides a vehicle lamp comprising:

- a body having a front face, a side, and an opening face, wherein said opening face is curved from the front face to the side;
- a lens covering the opening face of the body;
- a lighting chamber defined by the body and said lens;
- a first light source arranged in the lighting chamber;
- a reflector arranged in the lighting chamber, the reflector including a front side for reflecting the rays of the first light source substantially in the front direction, and also including a reverse side; and
- a second light source arranged adjacent the reverse side of the reflector so that rays of the second light source are reflected by the reverse side of the reflector and are irradiated substantially to the side of the body.

Accordingly, in the vehicle lamp of the present invention, since the second light source for irradiating the side is arranged on the reverse side of the reflector, it is unnecessary to arrange a light source in the sidewardly curved section. Due to the above structure, the thickness of the sidewardly curved section can be reduced.

BRIEF DESCRIPTION OF THE DRAWINGS

The above and other objects and advantages of the present invention will become more apparent by describing in detail preferred exemplary embodiments thereof with reference to the accompanying drawings wherein:

FIG. 1 is a view showing an embodiment of the vehicle lamp of the present invention together with FIGS. 2 to 4, wherein FIG. 1 is a front view;

DETAILED DESCRIPTION OF THE PREFERRED EMBODIMENTS

Figure 1:
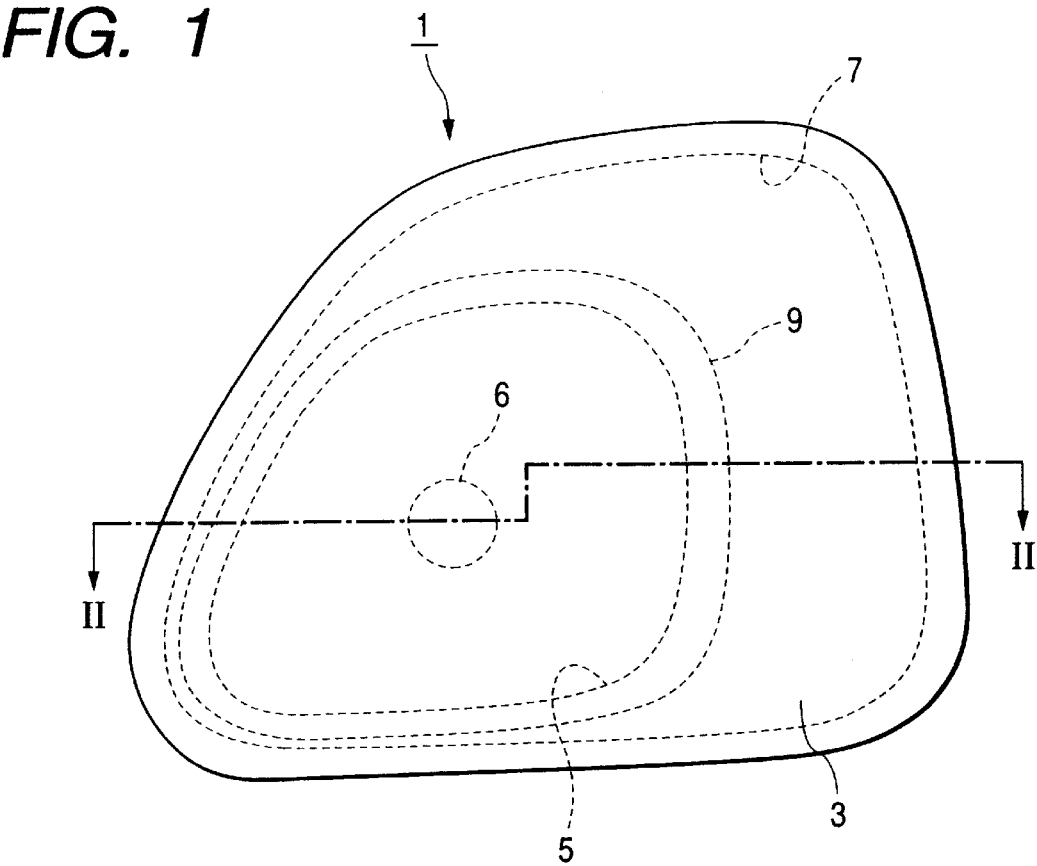

Referring to the appended drawings, an embodiment of the present invention will be explained in detail below.

In the embodiment shown in the drawings, the second light source is used as a light source of the tail and side-marker lamp.

Figure 2:
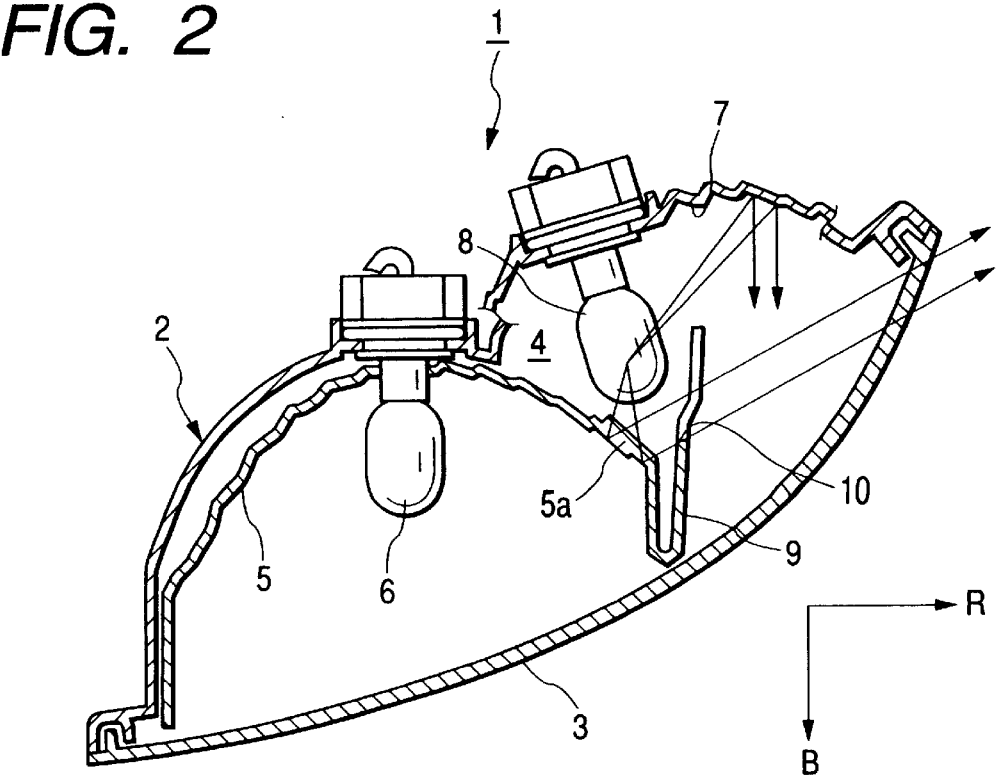
FIG. 2 is a cross-sectional view taken on line II—II in FIG. 1.
Figure 3:
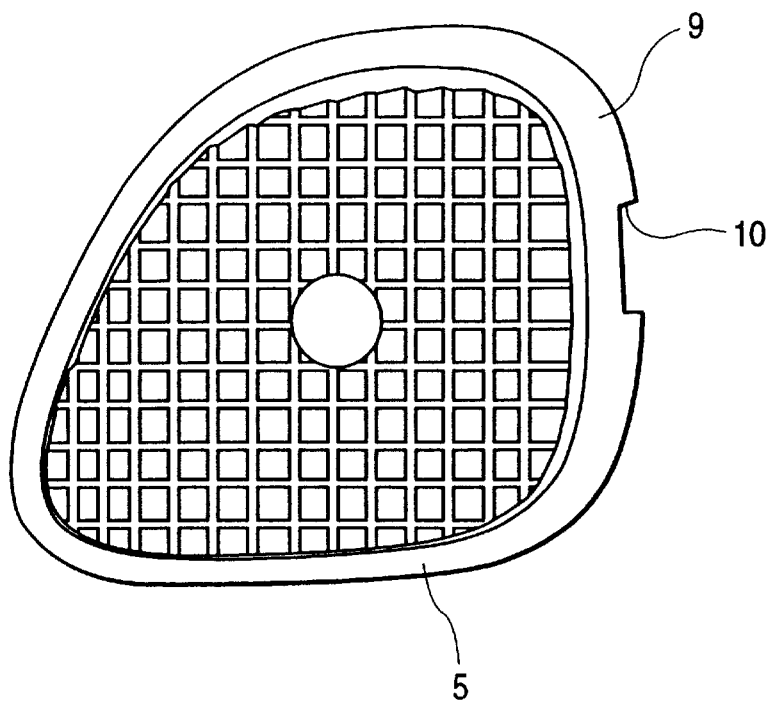
FIG. 3 is a front view showing a reflector.
Figure 4:
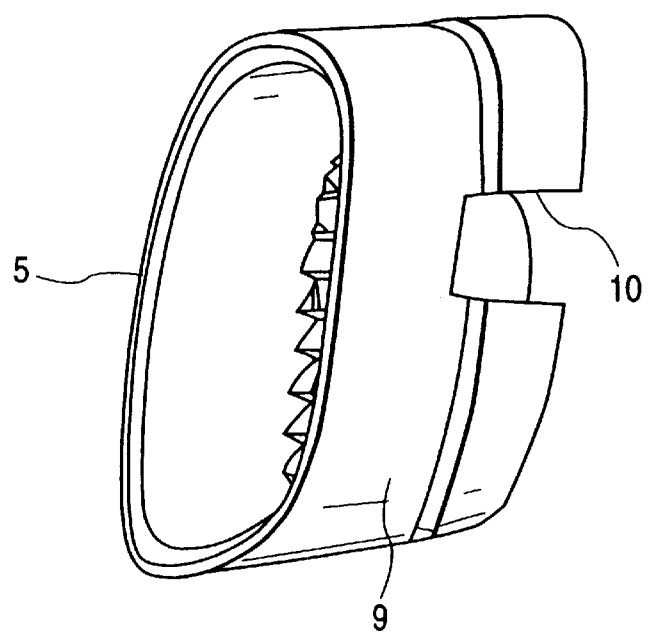
FIG. 4 is a right side view of a reflector.

The vehicle lamp 1 includes a body 2. An opening face of the body 2 is formed in the front and is continuously curved to the side. This vehicle lamp 1 is incorporated into the right rear portion of an automobile, for example. Accordingly, the front of the vehicle lamp 1 is directed to the rear of the automobile. That is, the front of the vehicle lamp 1 is directed in the direction of arrow B in FIG. 2. Also, the side of the vehicle lamp 1 is directed to the right. That is, the side of the vehicle lamp 1 is directed in the direction of arrow R in FIG. 2. The lens 3 is attached to the vehicle lamp in such a manner that the lens 3 covers the opening face. Therefore, the lighting chamber 4 is defined by the body 2 and the lens 3.

In the lighting chamber 4, there is provided a first reflector 5 which is positioned on the left. The first reflector is made of transparent material, and one of the faces of the first reflector, for example, the inside (surface) of the first reflector is covered with a reflecting film, so that the inside is formed into a reflecting face. At a predetermined position of the first reflector 5, there is provided a first electric bulb 6 which is the first light source. The rays of the first electric bulb 6 which are reflected by the first reflector 5 are irradiated substantially in the forward direction of the lamp. That is, the rays of the first electric bulb 6 which are reflected by the first reflector 5 are irradiated in the direction of arrow B in FIG. 2. Accordingly, the direct rays of the first electric bulb 6 and the reflected rays—which are reflected by the reflector 5—are irradiated through the lens 3. This first electric bulb 6 functions as a tail and stop lamp.

The inside of the body 2 is coated with a reflecting film so that the inside of the body 2 is formed into a second reflector 7. The first reflector 5 is located in the front, and on the left, of the second reflector 7. Therefore, when the second reflector 7 is seen from the front of the lamp, a portion of the second reflector 7 protrudes to the right, upward, and downward, from the first reflector 5. Lengths of an upward protrusion and downward protrusion are maximum on the right and are gradually decreased when it comes to the left. At the rear of the first reflector 5, the second electric bulb 8 (which is the second light source) is arranged at a predetermined positional relation with the second reflector 7. The rays of the second electric bulb 8 which are reflected by the second reflector 7 are irradiated in substantially the front direction of the lamp. That is, the rays of the second electric bulb 8 which are reflected on the second reflector 7 are irradiated in the direction of arrow B in FIG. 2.

The extending section 9, extending toward the rear of the lamp, is formed at an edge section on the right of the first reflector 5. A light-transmitting cut-out portion 10 is formed in a portion of the extending section 9 located on the side of the second electric bulb 8. The light-transmitting cut-out portion is also called a light-transmitting section. Accordingly, the second electric bulb 8 can be seen from the outside through the light-transmitting cut-out portion 10 of the extending section 9. Except for the above-described, the second electric bulb 8 is shaded from the outside by the first reflector 5 and the extending section 9. The light-transmitting cut-out portion 10 is formed by cutting out the extending section 9. However, the present invention is not limited to the above-described specific embodiment. Instead, the light-transmitting section can be formed by the transparent material itself which is not coated with the reflecting film. The second electric bulb 8 functions as a tail and side marker lamp. That is, the rays of the second electric bulb 8 which are reflected by the second reflector 7 are irradiated substantially in the front direction of the lamp, or in the direction of arrow B in FIG. 2, so that the vehicle lamp functions as a tail lamp. The direct rays of the second electric bulb 8 which are irradiated onto the side (in the direction of arrow R in FIG. 2) through the light-transmitting cut-out portion 10 of the extending section 9, and the rays of the second electric bulb 8 which are reflected on the reverse side of the reflecting face of the first reflector 5 and irradiated onto the side (in the direction of arrow R in FIG. 2) through the light-transmitting cut-out portion 10, function as a sidemarker lamp.

In the above-described embodiment, the wall thickness of one portion 5a of the first reflector 5 on the reverse side is made different from that of the surrounding portion of the first reflector 5. Therefore, the profile of the portion 5a, on the reverse side of the first reflector 5, can be formed into a predetermined profile. Due to the above structure, the rays of the second electric bulb 8 can be refracted in a predetermined direction. This structure will be explained in detail referring to FIG. 5.

Figure 5:
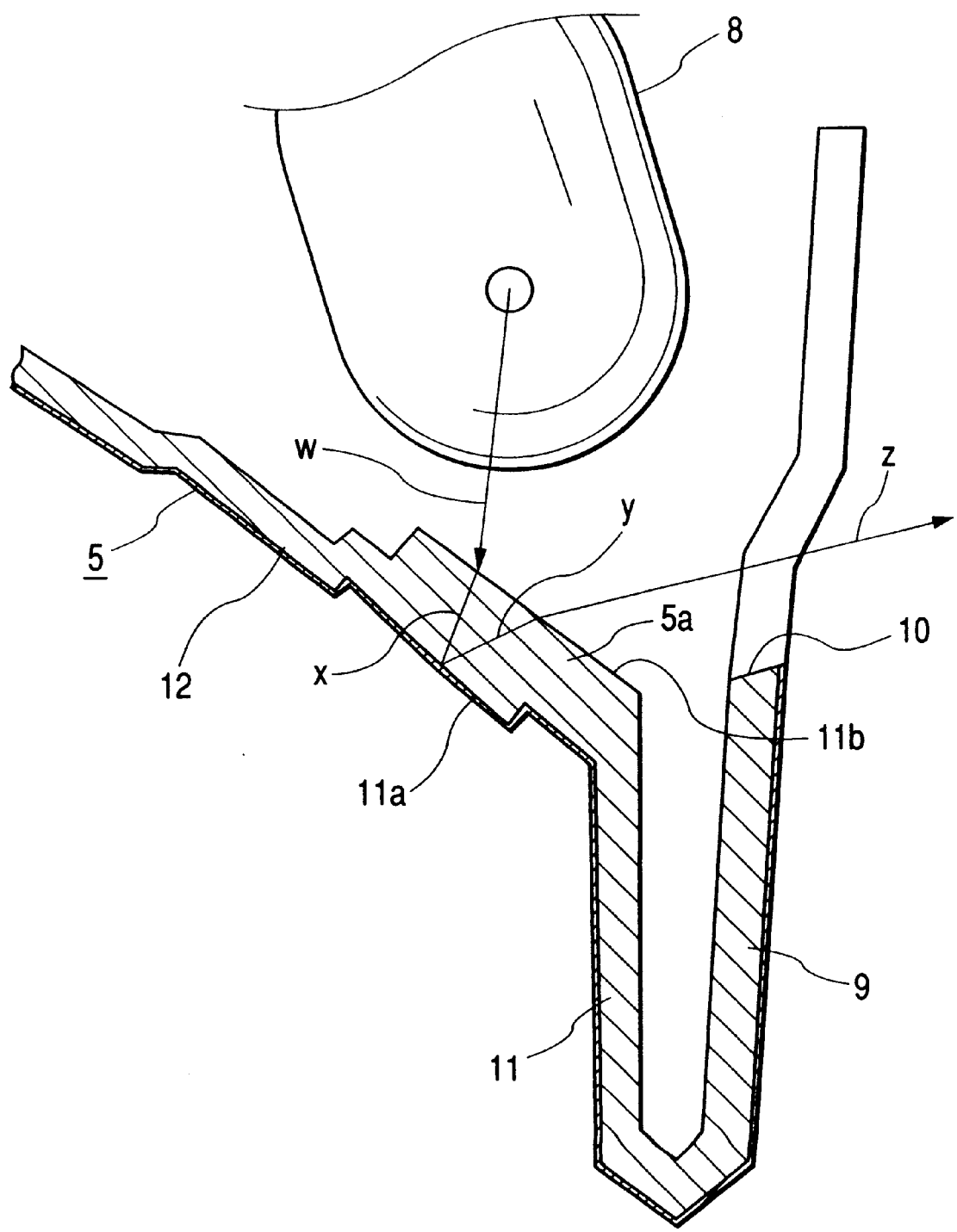
FIG. 5 is an enlarged view showing a primary portion.

As can be seen in FIG. 5, the first reflector 5 is composed in such a manner that the inside of the transparent material 11 is coated with the reflecting film 12 by means of vapor-deposition. The reflecting film 12 is formed on the inside of the transparent material 11 as described above, and the profile of the inside of the transparent material 11 is formed, taking into consideration the light distribution of the first electric bulb 6. Therefore, when the rays of the second electric bulb 8 are incident upon the portion 5a from the back face, and the incident rays are reflected by the reflecting film 12 coated on the inside 11a under the condition that the thickness of the transparent material 11 is the same (that is, under the condition that the inside 11a and the back face are parallel to each other in the portion 5a), it is impossible to reflect the rays of the second electric bulb 8 in a predetermined direction. Therefore, in this embodiment, the wall thickness of the transparent material in the portion 5a is changed, so that a predetermined angle can be formed between the inside 11a and the back face 11b. Originally, the rays w of the electric bulb 8, which proceed in air, are refracted on the boundary surface between the air layer and the transparent material 11, and the thus refracted rays x are reflected by the reflecting film 12 coated on the inside 11a in the portion 5a, and the thus reflected rays y are refracted again by the back face 11b in the portion 5a, that is, the thus reflected rays y are refracted again by the boundary surface between the air layer and the transparent material 11 and formed into the rays z, and these rays z are irradiated to the side through the light-transmitting cut-out 10 and the lens 3. Accordingly, whatever the profile of the inside 11a in the portion 5a may be, when the angle formed between the back face 11b in the portion 5a and the inside 11a is selected at an appropriate value, that is, when the wall thickness of the portion 5a is appropriately changed, the irradiating direction of the rays z can be controlled to be a predetermined direction. In this embodiment the back face 11b of the portion 5a is formed into a plane, however, when the back face 11b of the portion 5a is formed into a concave face or convex face, the direction of the rays z can be further controlled.

In the vehicle lamp 1, the second electric bulb for irradiating the side is arranged at the rear of the first reflector 5. Therefore, the thickness of the curved portion, which is curved to the side, can be reduced.

In the above-described embodiment, the second electric bulb 8 has two functions. One function is that of a tail lamp and the other function is that of a sidemarker lamp. When the second electric bulb 8 is made to have only one function of the side marker lamp, it is unnecessary to provide the second reflector 7. That is, the body 2 may be used as it is without providing the reflecting film.

The extending section 9 does not need to be provided. However, when the extending section 9 is provided and the optical path to the side is restricted by the light-transmitting cut-out 10, the direction of the side irradiation can be positively regulated. Even when the above extending section is provided, it is unnecessary for the extending section to be integrated with the first reflector into one body. That is, the extending section may be formed different from the first reflector 5.

In the above embodiment, the first reflector 5 is made of transparent material. When the first reflector 5 is made of opaque material, the inside surface is coated with a reflecting film to be used as the first reflector 5 and, at the same time, the outside or reverse surface of the portion 5a may be coated with a reflecting film.

The profile and structure of each section of each embodiment is a mere example of the embodiment of the present invention. Therefore, it should be noted that the technical scope of the present invention is not limited by the specific example described above.

As described above, a vehicle lamp of the present invention is characterized in that: an opening face of a body of the vehicle lamp is curved from the front face to the side; a lighting chamber is defined by the body and a lens covering the opening face of the body; a first light source is arranged in the lighting chamber; a first reflector, for reflecting the rays of the first light source substantially in the front direction, is arranged in the lighting chamber; and a second light source is arranged on the reverse side of the first reflector, so that the rays of the second light source are reflected on the back face of the first reflector and are irradiated substantially onto the side.

Accordingly, in the vehicle lamp of the present invention, since the second light source for irradiating the side is arranged on the reverse side of the reflector, it is unnecessary to arrange a light source in the sidewardly curved section. Due to the above structure, the thickness of the sidewardly curved section can be reduced.

In a vehicle lamp according to a second aspect of the present invention, the reflector is made of transparent material, and a reflecting face is formed on one of the faces of the reflector. Therefore, it is unnecessary to provide a different member for reflecting the rays of the second light source.

In a vehicle lamp according to a third aspect of the present invention, a predetermined face is formed when the thickness of a portion of the reflector is made different from that of an adjacent portion. Also, a reflecting face is formed on the predetermined face so that it can be used as a side reflecting face, and the rays of the second light source are reflected, by the reflecting face, substantially to the side of the lamp. Therefore, the irradiating direction of the rays of the second electric bulb can be controlled in a predetermined direction.

In a vehicle lamp according to a fourth aspect of the present invention, the second light source functions as a tail lamp or a tail and stop lamp. Therefore, although the number of parts is small, it is possible to provide two functions.

A vehicle lamp according to a fifth aspect of the present invention includes any one or more of the first to fourth aspects, and, further comprises: an extending section arranged integrally with or separately from the reflector, extending backward from an edge section of the reflector, covering the side of the second light source, wherein the extending section includes a light-transmitting section through which the rays of the second light source can be irradiated onto the side. Therefore, side irradiation can be controlled so as to be conducted only in a predetermined direction.

The present invention is not limited to the specific above-described embodiments. It is contemplated that numerous modifications may be made to the vehicle lamp of the present invention without departing from the spirit and scope of the invention as defined in the following claims.

What is claimed is:

1. A vehicle lamp comprising:
    a body having a front face, a side, and an opening face, wherein said opening face is curved from the front face to the side;
    a lens covering the opening face of the body;
    a lighting chamber defined by the body and said lens;
    a first light source arranged in the lighting chamber;
    a reflector arranged in the lighting chamber, said reflector including a front side for reflecting the rays of the first light source substantially in the front direction, and also including a back side; and
    a second light source arranged adjacent the back side of the reflector so that rays of the second light source are back by the back side of the reflector and are irradiated substantially to the side of said body.

2. A vehicle lamp according to claim 1, wherein the reflector is made of transparent material, and a reflecting face is formed on one of the front side and the back side of the reflector.

3. A vehicle lamp according to claim 2, further comprising:
    a predetermined face formed in said reflector, wherein said predetermined face includes a thickness of a portion of the reflector that is made different from that of an adjacent portion of the reflector; and
    a reflecting face formed on the predetermined face so that it can be used as a side reflecting face, whereby the rays of the second light source that are reflected by the reflecting face are directed substantially to the side of said body.

4. A vehicle lamp according to claim 2, wherein the second light source is a tail lamp or a tail and stop lamp.

5. A vehicle lamp according to claim 2, further comprising:
    an extending section arranged integrally with or separately from the reflector, extending backward from an edge section of the reflector, said extending section covering a side of the second light source, and said extending section including a light-transmitting section through which the rays of the second light source can be irradiated to the side of said body.

6. A vehicle lamp according to claim 1, further comprising:
    a predetermined face formed in said reflector, wherein said predetermined face includes a thickness of a portion of the reflector that is made different from that of an adjacent portion of the reflector; and
    a reflecting face formed on the predetermined face so that it can be used as a side reflecting face, whereby the rays of the second light source that are reflected by the reflecting face are directed substantially to the side of said body.

7. A vehicle lamp according to claim 6, wherein the second light source is a tail lamp or a tail and stop lamp.

8. A vehicle lamp according to claim 6, further comprising:
    an extending section arranged integrally with or separately from the reflector, extending backward from an edge section of the reflector, said extending section covering a side of the second light source, and said extending section including a light-transmitting section through which the rays of the second light source can be irradiated to the side of said body.

9. A vehicle lamp according to claim 1, wherein the second light source is a tail lamp or a tail and stop lamp.

10. A vehicle lamp according to claim 9, further comprising:
    an extending section arranged integrally with or separately from the reflector, extending backward from an edge section of the reflector, said extending section covering a side of the second light source, and said extending section including a light-transmitting section through which the rays of the second light source can be irradiated to the side of said body.

11. A vehicle lamp according to claim 1, further comprising:
    an extending section arranged integrally with or separately from the reflector, extending backward from an edge section of the reflector, said extending section covering a side of the second light source, and said extending section including a light-transmitting section through which the rays of the second light source can be irradiated to the side of said body.

* * * * *